United States Patent [19]
Yamamoto et al.

[11] Patent Number: 6,078,615
[45] Date of Patent: *Jun. 20, 2000

[54] ENCODING/DECODING APPARATUS WHICH PERFORMS AN INVERSE ORTHOGONAL TRANSFORMATION ON DECODED DATA

[75] Inventors: Yukinori Yamamoto, Tokyo; Makoto Shimokoriyama, Kawasaki; Izumi Matsui, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/761,011

[22] Filed: Dec. 5, 1996

Related U.S. Application Data

[63] Continuation of application No. 08/217,280, Mar. 24, 1994, abandoned.

[30] Foreign Application Priority Data

| Mar. 31, 1993 | [JP] | Japan | 5-074034 |
| Jul. 5, 1993 | [JP] | Japan | 5-165625 |

[51] Int. Cl.[7] .................................................. H04N 7/12
[52] U.S. Cl. ........................... 375/240; 348/403; 348/420
[58] Field of Search ................... 348/384, 390, 348/400–403, 405, 409–415, 420; 386/109; 375/240; H04N 7/133, 7/12

[56] References Cited

U.S. PATENT DOCUMENTS

| 4,691,329 | 9/1987 | Juri et al. | 348/403 |
| 5,091,782 | 2/1992 | Krause et al. | 348/400 |
| 5,109,451 | 4/1992 | Aono et al. | 348/403 |
| 5,144,428 | 9/1992 | Okuda et al. | 348/403 |
| 5,196,930 | 3/1993 | Kadono et al. | 348/403 |
| 5,253,078 | 10/1993 | Balkanski et al. | 348/409 |
| 5,424,777 | 6/1995 | Koga et al. | 348/403 |

*Primary Examiner*—Richard Lee
*Attorney, Agent, or Firm*—Fitzpatrick Cella Harper & Scinto

[57] ABSTRACT

An encoding apparatus includes an input section which inputs image data, and a calculating section which calculated DCT coefficients of a predetermined frequency region on the basis of the image data. A decision unit judges a correlation of the image data on the basis of the DCT coefficients calculated by the calculating section, and a transforming section performs an orthogonal transformation to the image data in accordance with an output of the decision unit. An encoding section encodes the image data transformed by the transforming section. Also included is an encoding and decoding apparatus having an input section which inputs information data, and an orthogonal transforming section which performs an orthogonal transforation of the input information data. An encoding section encodes the transformation data transformed by the orthogonal transforming section, and a decoding section decodes the encoding data encoded by the encoding section by using the orthogonal transforming section.

23 Claims, 10 Drawing Sheets

— EVEN FIELD
----- ODD FIELD

FIG. 2B
(PRIOR ART)
4×8

EVEN DATA

4×8

ODD DATA

EVEN DATA

4×8

ODD DATA

| e0 | e4 | e8 | e12 | e16 | e20 | e24 | e28 |
| o0 | o4 | o8 | o12 | o16 | o20 | o24 | o28 |
| e1 | e5 | e9 | e13 | e17 | e21 | e25 | e29 |
| o1 | o5 | o9 | o13 | o17 | o21 | o25 | o29 |
| e2 | e6 | e10 | e14 | e18 | e22 | e26 | e30 |
| o2 | o6 | o10 | o14 | o18 | o22 | o26 | o30 |
| e3 | e7 | e11 | e15 | e19 | e23 | e27 | e31 |
| o3 | o7 | o11 | o15 | o19 | o23 | o27 | o31 |

FIG. 9

FIG. 10A (8×8) DCT

| 1 | 2 | 6 | 7 | 15 | 16 | 28 | 29 |
|---|---|---|---|----|----|----|----|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

FIG. 10B (4×8×2) DCT

| 1 | 3 | 7 | 19 | 21 | 35 | 37 | 51 |
|---|---|---|----|----|----|----|----|
| 5 | 9 | 17 | 23 | 33 | 39 | 49 | 53 |
| 11 | 15 | 25 | 31 | 41 | 47 | 55 | 61 |
| 13 | 27 | 29 | 43 | 45 | 57 | 59 | 63 |

| 2 | 4 | 8 | 20 | 22 | 36 | 38 | 52 |
|---|---|---|----|----|----|----|----|
| 6 | 10 | 18 | 24 | 34 | 40 | 50 | 54 |
| 12 | 16 | 26 | 32 | 42 | 48 | 56 | 62 |
| 14 | 28 | 30 | 44 | 46 | 58 | 60 | 64 |

ENCODING/DECODING APPARATUS WHICH PERFORMS AN INVERSE ORTHOGONAL TRANSFORMATION ON DECODED DATA

This application is a continuation of application Ser. No. 08/217,280 filed Mar. 24, 1994, now abandoned.

BACKGROUND OF THE INVENTION

1. Field of the Invention

The present invention relates to an encoding/decoding apparatus which can accomplish a high efficient encoding of input information data.

2. Related Background Art

In association with the digitization of an image signal, a high efficient encoding technique is also important.

There is an orthogonal transformation encoding as effective means for high efficient encoding. According to the orthogonal transformation, an input time-sequential signal is transformed into an orthogonal component (for example, frequency component).

As specific examples of the orthogonal transformation, a Fourier transformation, a discrete cosine transformation (hereinafter, abbreviated to DCT), a Hadamard transformation, and the like are known. In particular, the DCT is considered as an orthogonal transformation suitable for image information.

An encoding method using the DCT will now be described.

Figure 1:
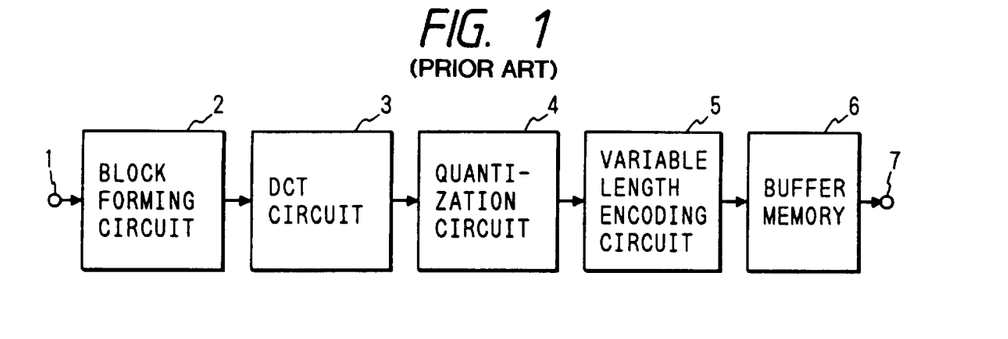
FIG. 1 is a block diagram of an encoding apparatus using a conventional DCT.

FIG. 1 is a block diagram of a conventional encoding apparatus using the DCT.

In FIG. 1, a digital image signal which is input from an input section 1 is divided into blocks on a DCT unit basis by a block forming circuit 2. As a size of each of the divided blocks, a 2-dimensional DCT block of total 64 pixels comprising [(eight pixels in the horizontal direction)×(eight pixels in the vertical direction)] is frequently used.

The block-formed image signal is two-dimensionally DCT transformed by a DCT circuit 3 into a DCT component.

The transformed DCT component is quantized by a quantization circuit 4 and is variable length encoded by a variable length encoding circuit 5. The encoded data is converted to a data of a predetermined rate by a buffer memory 6 and is output therefrom.

In recent encoding apparatus using the DCT, an apparatus for efficiently encoding by using an inter-field correlation has been proposed.

Figure 2A:
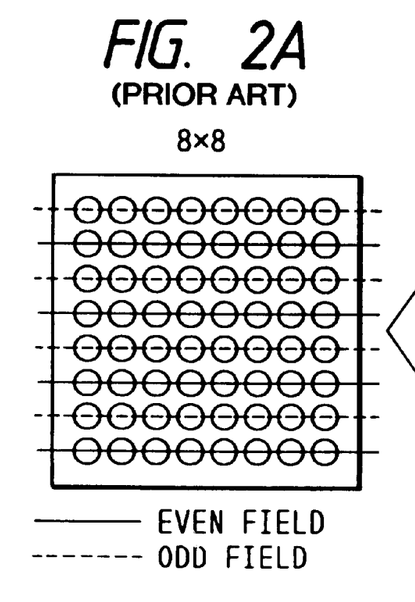
FIGS. 2A and 2B are diagrams for describing DCT blocks in case of dividing an even field pixel train and an odd field pixel train.
Figure 2B:
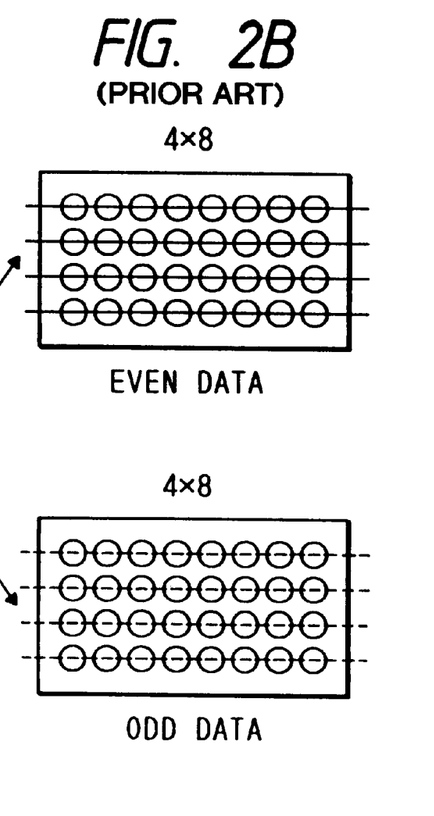

Namely, when the inter-field correlation is weak (low), the intra-field DCT (a DCT process is executed in the block comprising 4×8 pixels) is executed (refer to FIG. 2B) (hereinafter, referred to as a field transforming mode) and, when the inter-field correlation is strong (high), the intra-frame DCT (a DCT process is executed in the block comprising 8×8 pixels) is executed (hereinafter, referred to as a frame transforming mode), thereby raising an encoding efficiency (refer to FIG. 2A).

A conventional selecting method of selecting a transforming mode will now be described hereinbelow.

Differential absolute values between the even field pixels of the block (8×8 pixels) which is read out from the block forming circuit 2 and the odd field pixels which are one field after the even field pixels are calculated, the intra-block total of those differential absolute values is calculated, and its total value is compared with a predetermined threshold value, thereby selecting the transforming mode in accordance with the result of the comparison (namely, a field correlation is detected).

In the above judgment, a selection regarding whether the signal can be concentrated into a lower frequency region is made by executing the transforming process the selected modes (frame/field). That is namely, in case of encoding, a selection regarding whether an amount of codes which are generated is smaller by executing the selected transforming process becomes a problem.

Therefore, a fairly large circuit is needed to accurately select the proper transforming mode. In addition, since it takes a predetermined processing time until the transforming mode is selected, an inconvenience occurs in case of a moving image which needs a real-time process.

Figure 3:
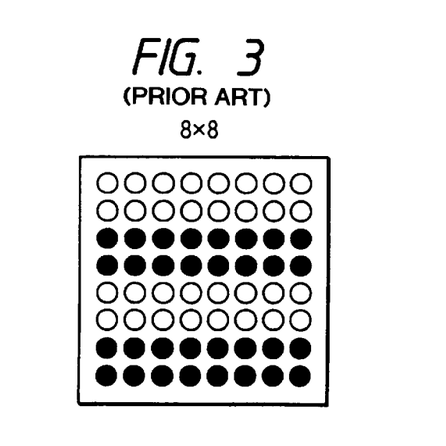
FIG. 3 is a diagram showing an example in which a frame transforming mode is selected by a conventional transforming mode selecting method.
Figure 4A:
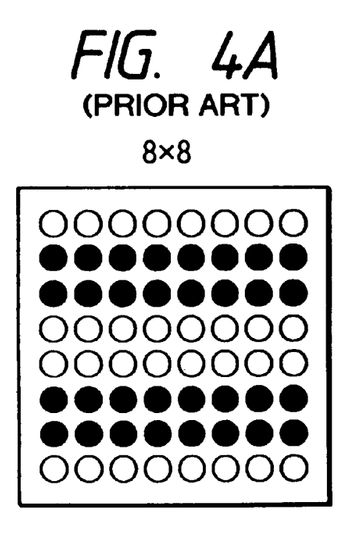
FIGS. 4A and 4B are diagrams showing an example in which a field transforming mode is selected by the conventional transforming mode selecting method.

In the conventional transforming mode selecting method as mentioned above, for instance, in the case where there is a correlation of every two lines in the data in the block, a large difference occurs when comparing FIGS. 3 and 4A.

Namely, when the transforming mode is selected by the conventional method as mentioned above, in FIG. 3, it is judged that the inter-field correlation is high, so that the frame transforming mode is selected. In FIG. 4A, it is judged that the inter-field correlation is low, so that the field transforming mode is selected.

Figure 4B:
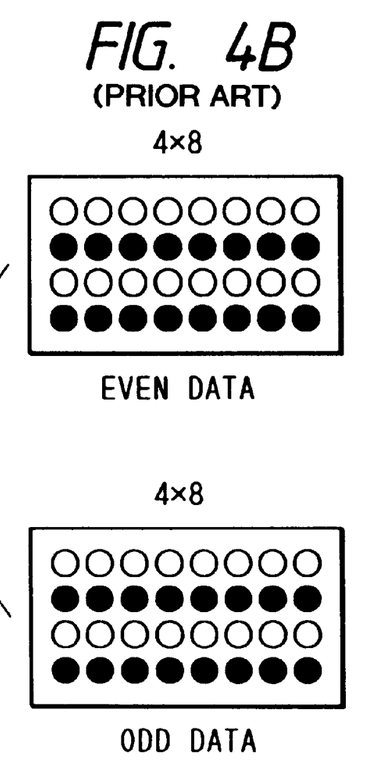

When the DCT process is executed for the block data shown in FIG. 4A, the data in the block is rearranged as shown in FIG. 4B. The block data is divided into an even field pixel data block and an odd field pixel data block. The DCT process is executed for each block. In this case, therefore, as transformation coefficients of the even/odd field pixel data block, a coefficient also exists in the high frequency region, so that an inconvenience such that an encoding efficiency is contrarily deteriorated occurs.

SUMMARY OF THE INVENTION

Under such circumstances, it is an object of the present invention to provide an encoding apparatus which can accomplish a high efficient encoding even when any information data is input.

For this purpose, according to one preferred embodiment, there is provided an encoding apparatus having input means for inputting image data; calculating means for calculating DCT coefficients in a predetermined frequency region on the basis of the image data; decision means for deciding a correlation of the image on the basis of the DCT coefficients calculated by the calculating means; transforming means for performing an orthogonal transformation to the image data in accordance with an output of the decision means; and encoding means for encoding the image data transformed by the transforming means.

Another object of the invention is to provide an encoding and decoding apparatus which can accomplish high efficient encoding/decoding without enlarging a circuit scale even when any information data is input.

For this purpose, according to another preferred embodiment, there is provided an encoding/decoding apparatus having input means for inputting information data; orthogonal transforming means for performing an orthogonal transformation to the input information data; encoding means for encoding the transformation data transformed by the orthogonal transforming means; and decoding means for decoding the encoding data encoded by the encoding means by using the orthogonal transforming means.

Other objects and advantages of the invention will become apparent from the following detailed description taken in conjunction with the appended claims.

DETAILED DESCRIPTION OF THE PREFERRED EMBODIMENTS

A digital VTR of the first embodiment according to the present invention will now be described hereinbelow with reference to the drawings.

Figure 5:
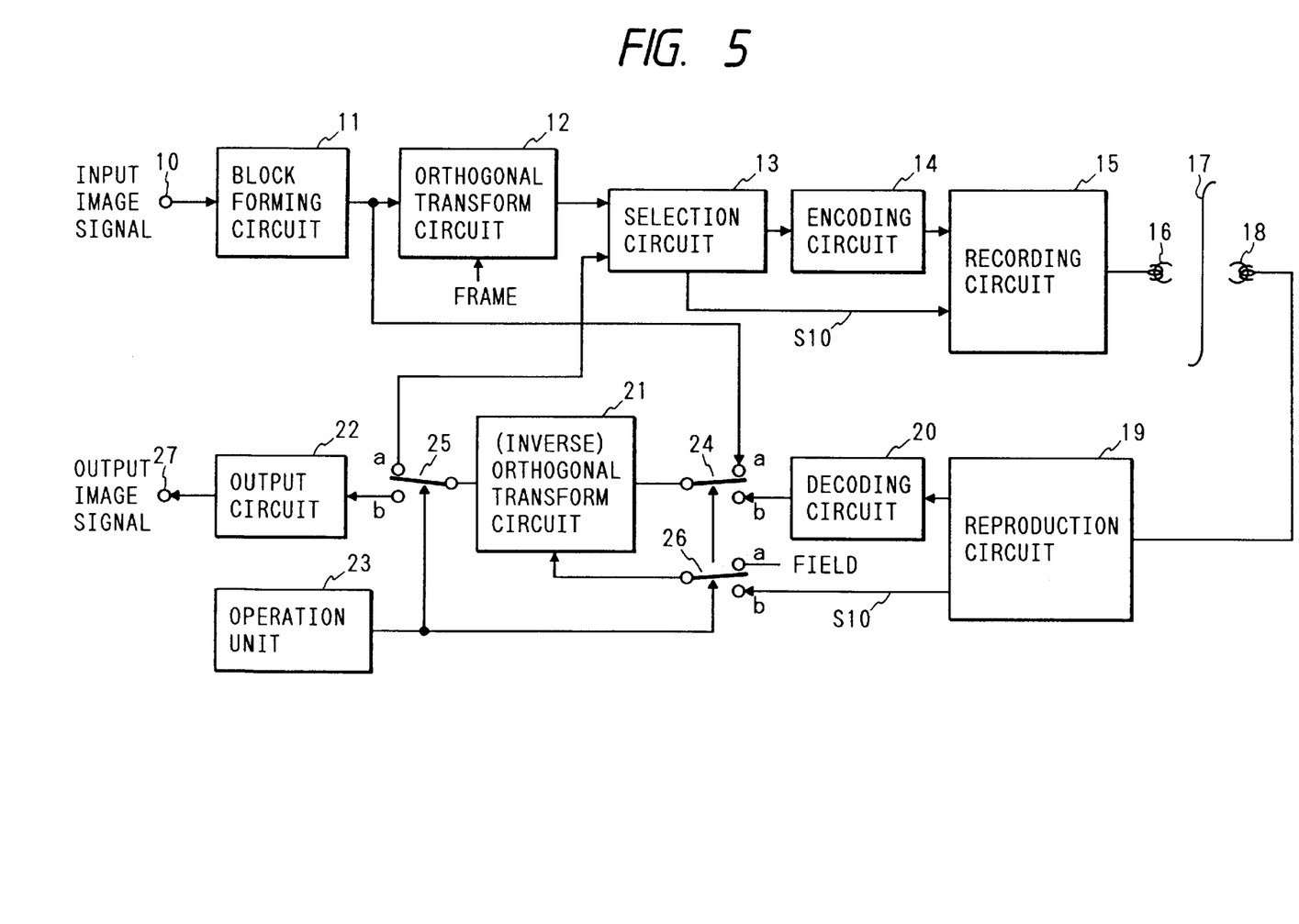
FIG. 5 is a block diagram of a digital VTR of a first embodiment according to the present invention.

FIG. 5 is a block diagram of the digital VTR of the first embodiment according to the invention.

In FIG. 5, reference numeral 10 denotes an input section to input a digital image signal; 11 a block forming circuit; 12 an orthogonal transform circuit for performing a DCT transformation; 13 a selection circuit; 14 an encoding circuit; 15 a recording circuit; 16 a recording head; 17 a magnetic tape; 18 a reproducing head; 19 a reproduction circuit; 20 a decoding circuit; 21 an (inverse) orthogonal transform circuit; 22 an output circuit; 23 an operation unit; 24, 25, and 26 change-over switches; and 27 an output section for outputting the decoded digital image signal.

The recording and reproducing processing operations of the digital VTR constructed as shown in FIG. 5 will now be described hereinbelow.

The processing operation upon recording will now be described.

By instructing the recording operation by the operation unit 23, each of the change-over switches 24, 25, and 26 is connected to the (a) side.

The digital image signal supplied to the block forming circuit 11 is processed to form blocks (8×8).

The block formation processed image data is input to the (inverse) orthogonal transform circuit 21 through the orthogonal transform circuit 12 and changeover switch 24. The orthogonal transform circuit 12 is an exclusive-use orthogonal transform circuit which is used only for the frame transformation, namely, for (8×8)-blocks.

The image data which was DCT transformed by the orthogonal transform circuit 12 is output to the selection circuit 13.

On the other hand, the (inverse) orthogonal transform circuit 21 can execute the field transformation (4×8×2) upon recording and can perform the field/frame inverse conversion upon reproduction.

The orthogonal transformation and the inverse orthogonal transformation are switched by the changeover switch 26.

The (inverse) orthogonal transform circuit 21 executes the DCT transformation by the field transformation (4×8×2) to the (8×8) block data which was output from the block forming circuit 11 and supplies the transformed image data to the selection circuit 13.

Figure 10A:
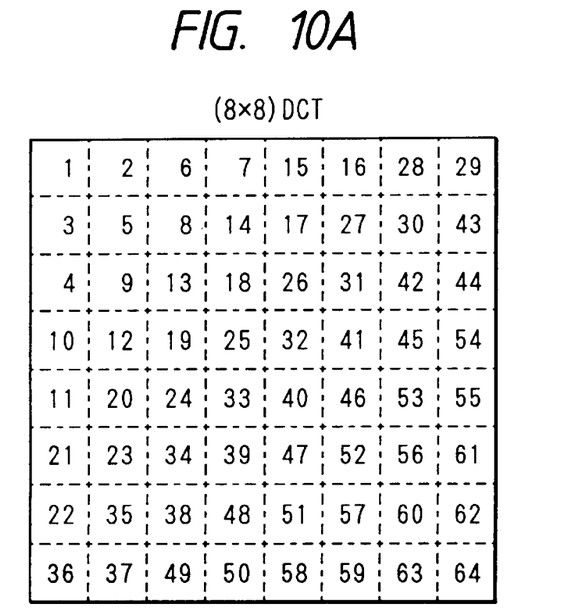
FIGS. 10A and 10B are diagrams for explaining a method of reading out block data which was DCT transformed.
Figure 10B:
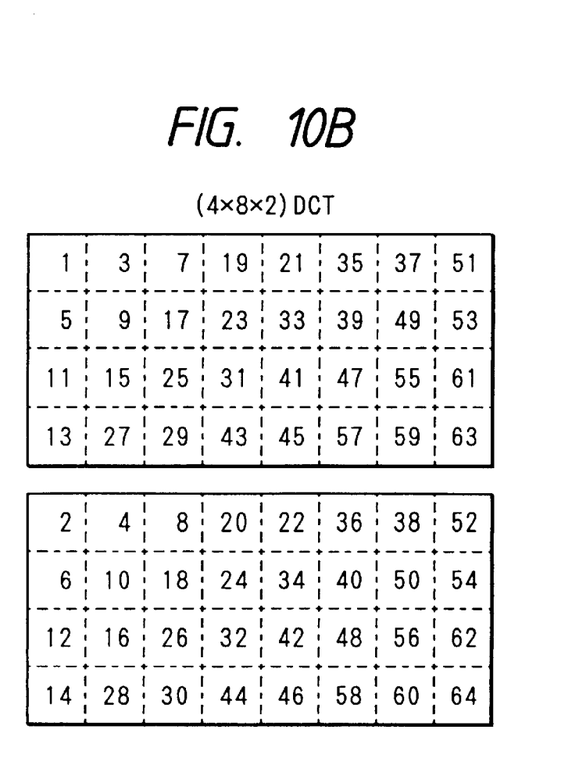

Upon recording, the image data which is output from the orthogonal transform circuit 12 and the (inverse) orthogonal transform circuit 21 is the data which was read out in accordance with the order of the numbers shown in FIGS. 10A and 10B.

The selection circuit 13 compares the frame transformation data from the orthogonal transform circuit 12 and the field transformation data from the (inverse) orthogonal transform circuit 21 and selects either one of the frame and field transforming modes.

As a selecting method in this instance, a check is made to see if a larger amount of data of which one of the transformation data is concentrated in a low frequency component, and the transformation data which is more concentrated is selected.

The selection circuit 13 provides to the recording circuit 15 a selection signal S10 to make it possible to discriminate which one of the frame and field transforming modes is selected.

The transformation data which is output from the selection circuit 13 is quantized and variable length encoded by the encoding circuit 4, thereby reducing a data amount.

An error correction code and the, selection signal S10, are added by the recording circuit 15 to the data which was encoded by the encoding circuit 14. The resultant data is subjected to a predetermined modulating process for recording.

The information data processed by the recording circuit 15 is recorded onto the magnetic tape 17 by the recording head 16.

The processing operation upon reproduction will now be described hereinbelow.

First, when the reproducing operation is instructed by the operation unit 23, each of the switches 24 to 26 is connected to the (b) side.

The information data recorded on the magnetic tape 17 is read out by the reproducing head 18 and is subjected to a demodulating process and an error correcting process by the reproduction circuit 19, thereby reproducing the recorded selection signal together with the image data.

The decoding circuit 20 decodes variable length encoding data.

The decoding data generated from the decoding circuit 20 is supplied to the (inverse) orthogonal transform circuit 21.

The (inverse) orthogonal transform circuit 21 executes an inverse orthogonal transformation (inverse DCT) of the frame or field transformation on the basis of the selection signal from the reproducing circuit 19.

The image data processed by the (inverse) orthogonal transforming circuit 11 is subjected to a concealment process or the like of error uncorrectable data by the output circuit 22, so that the reconstructed digital image signal is output from the output section 27.

As described above, by commonly using the orthogonal transform circuit on the reproducing side upon recording, the transforming mode (field/frame) such that a data amount upon encoding is certainly reduced without enlarging a circuit scale can be selected. Further, a high efficient encoding process can be performed at a high speed.

A digital VTR of the second embodiment according to the invention will now be described hereinbelow with reference to the drawings.

Figure 6:
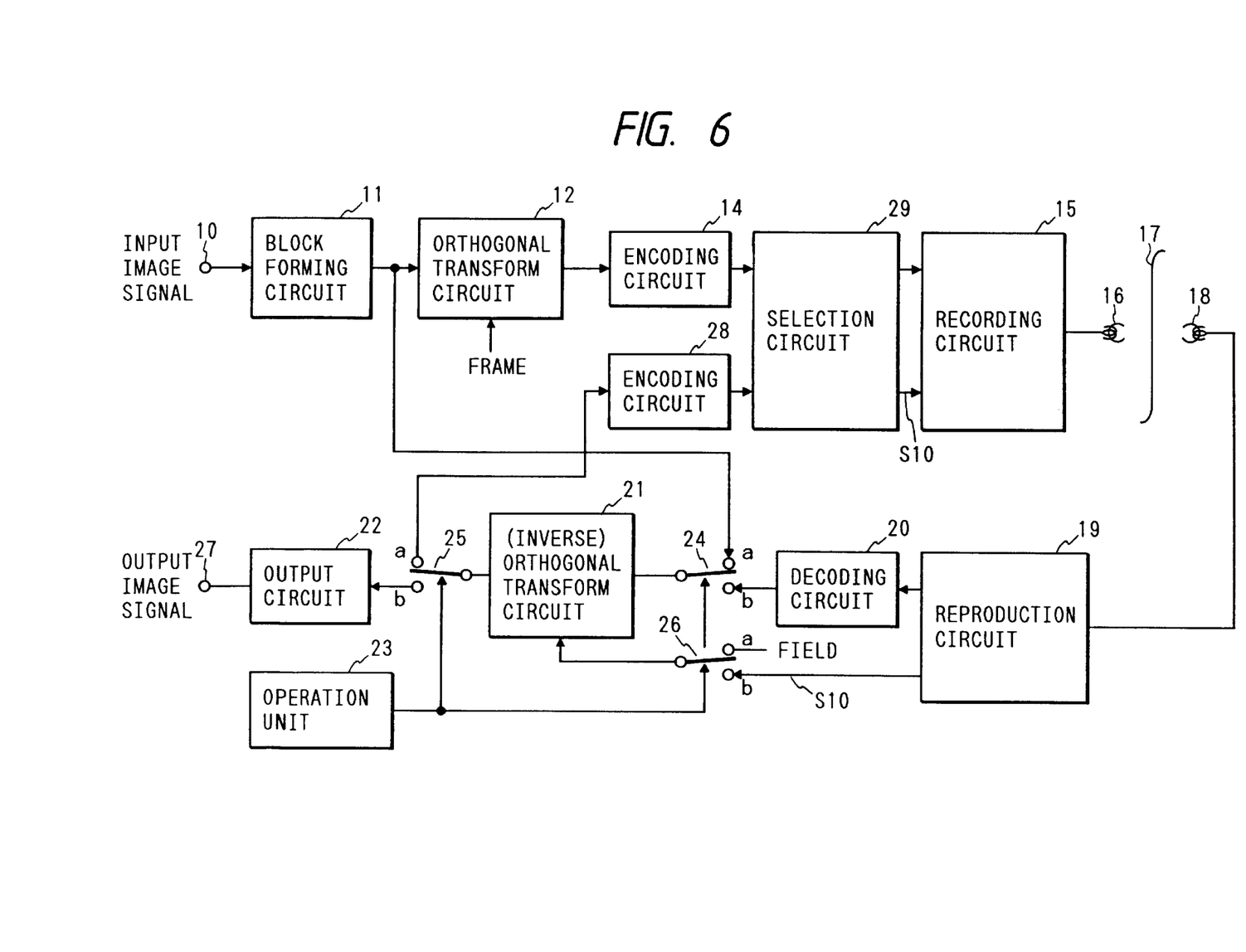
FIG. 6 is a block diagram of a digital VTR of a second embodiment according to the invention.

FIG. 6 is a block diagram of the digital VTR of the second embodiment according to the invention. In FIG. 6, the same or corresponding portions as those shown in FIG. 5 are designated by the same reference numerals and their descriptions are omitted here.

In FIG. 6, reference numeral 28 denotes an encoding circuit and 29 a selection circuit to select either one (namely, the data having a smaller amount of information) of the two encoding data encoded by the encoding circuits 14 and 28.

The recording and reproducing processes of the apparatus constructed as shown in FIG. 6 will now be described hereinbelow. Only the processing operations different from those in the first embodiment will now be described.

The image data which was frame transformed (8×8) by the orthogonal transform circuit 12 is encoded by the encoding circuit 14 and is output to the selection circuit 29. The image data which was field transformed (4×8×2) by the (inverse) orthogonal transform circuit 21 is encoded by the encoding circuit 24 and is output to the selection circuit 29.

The selection circuit 29 compares an amount of data which was encoded by the frame transformation and an amount of data which was encoded by the field transformation and selects the encoded data in which a data amount is smaller. The selection circuit 29 outputs the selected data. The subsequent processes are omitted because they are substantially the same as those in the first embodiment.

In the second embodiment as mentioned above, since either one of the frame transformation and the field transformation is selected on the basis of the amount of encoding data after completion of the encoding, a smaller amount of encoding data can be certainly selected.

A digital VTR of the third embodiment according to the present invention will now be described hereinbelow with reference to the drawings.

Figure 7:
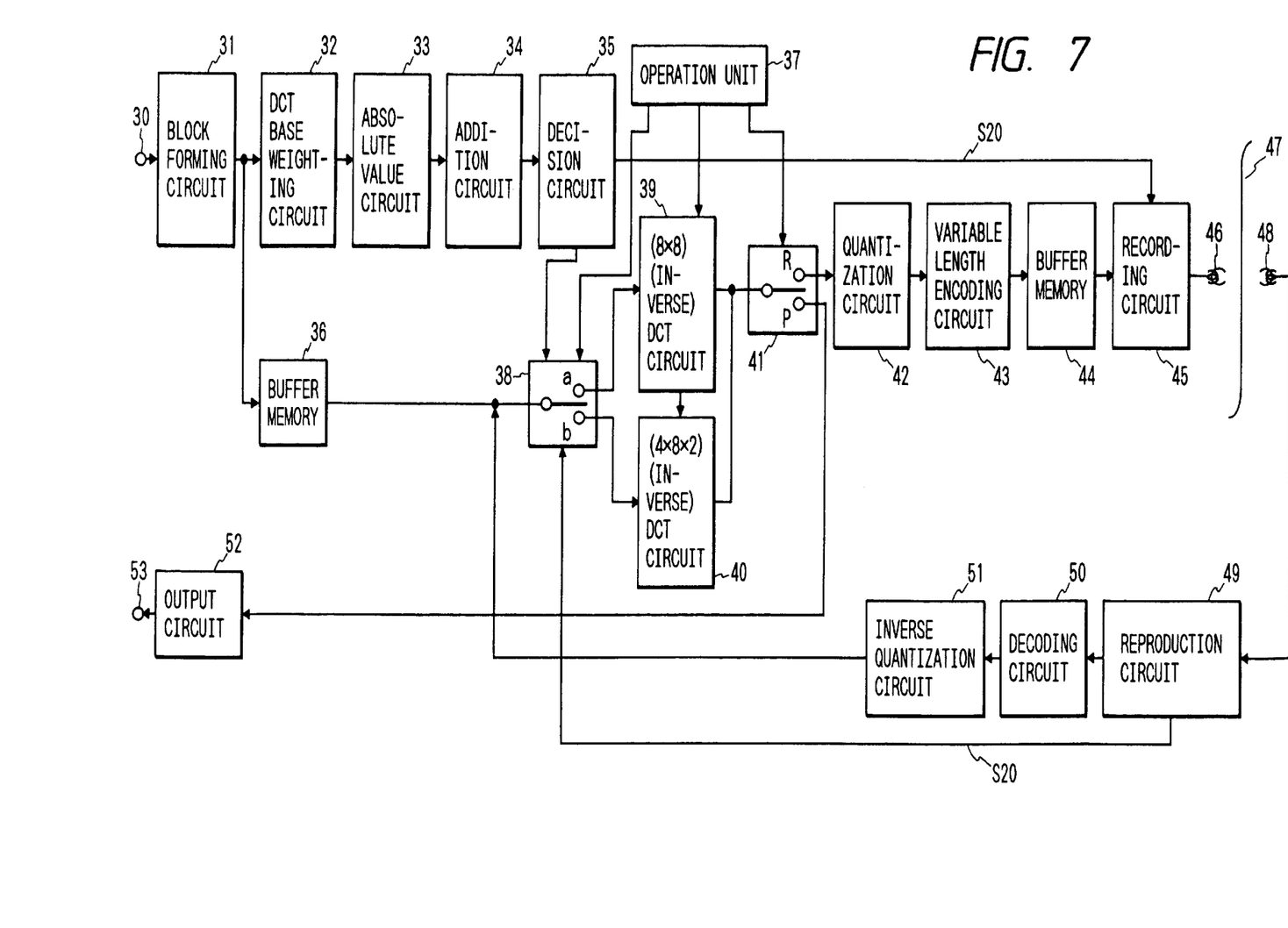
FIG. 7 is a block diagram of a digital VTR of a third embodiment according to the invention.

FIG. 7 is a block diagram of the digital VTR of the third embodiment according to the invention.

In FIG. 7, reference numeral 30 denotes an input section to input a digital image signal; 31 a block forming circuit to divide the input signal into (8×8)-blocks; 32 a DCT base weighting circuit; 33 an absolute value circuit; 34 an addition circuit; 35 a decision circuit; 36 a buffer memory; 37 an operation unit for switching the recording and reproducing processes; 38 and 41 change-over switches; 39 an (8×8) (inverse) DCT circuit to perform the frame transformation; 40 a (4×8×2) (inverse) DCT circuit to perform the field transformation; 42 a quantization circuit; 43 a variable length encoding circuit; 44 a buffer memory; 45 a recording circuit; 46 a recording head; 47 a magnetic tape; 48 a reproducing head; 49 a reproduction circuit; 50 a decoding circuit; 51 an inverse quantization circuit; 52 an output circuit; and 53 an output section to output digital image data which was decoded.

The recording and reproducing processing operations of the digital VTR constructed as shown in FIG. 7 will now be described hereinbelow.

The processing operation upon recording will be first described.

By instructing the recording operation by the operation unit 37, the change-over switch 41 is connected to the R side. The change-over switch 38 is switched by an instruction of the decision circuit 35. Further, the (8×8) (inverse) DCT circuit 39 and the (4×8×2) (inverse) DCT circuit 40 are switched to the DCT transforming (sampling data→frequency data) process.

The digital image signal supplied from the input section 30 is divided into the blocks each comprising (8×8) pixels by the block forming circuit 31.

The image data which was block formed by the block forming circuit 31 is supplied to the DCT base weighting circuit 32. A high frequency DCT base is weighted and added to the pixel data in the vertical direction in the block by the DCT base weighting circuit 32.

The absolute value of an output from the DCT base weighting circuit 32 is calculated by the absolute value circuit 33.

The addition circuit 34 adds the output data in every vertical direction from the absolute value circuit 33, so that the sum of all of the absolute values in the entire block is calculated.

The above calculating process will now be specifically described.

The seventh order DCT base as a highest degree in the case of the (8×8) DCT is given by:

$$\cos[\{(2k+1)\times 7\pi\}/16] \ k=0 \text{ to } 7$$

Therefore, the seventh order DCT base is (0.195, −0.556, 0.831, −0.981, 0.981, −0.831, 0.556, −0.195).

Figure 8:
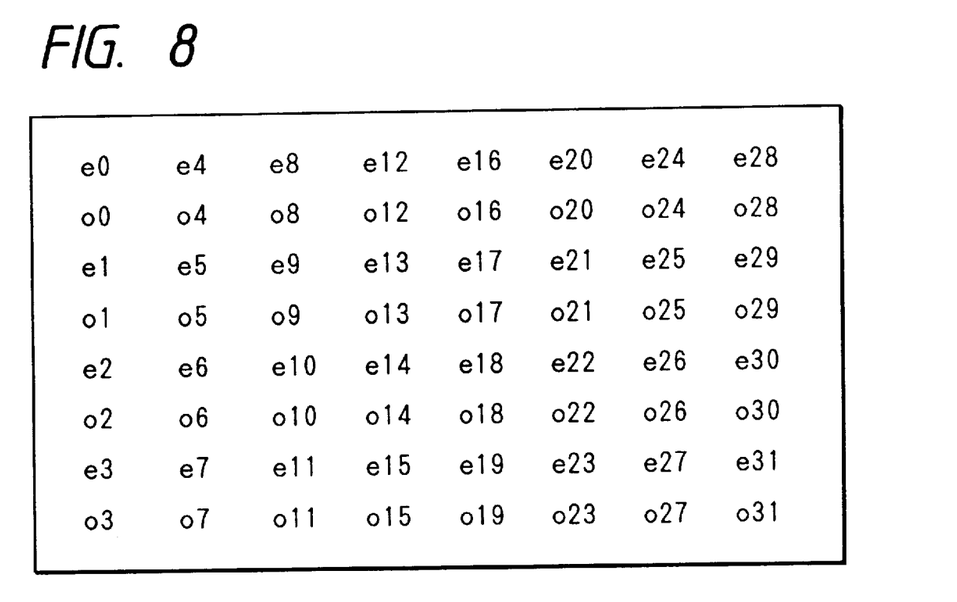
FIG. 8 is a diagram showing (8×8) pixel block data.

As shown in FIG. 8, now assuming that the pixel data of the block of (8×8) pixels is e0, e1, e2, . . . , e31, o0, o1, o2, . . . , o31, the above DCT base is weighted and added to the pixel data of e0, o0, e1, o1, e2, o2, e3, and o3 and the absolute value is calculated. Similar calculations are subsequently executed to the pixel data of e4, o4, e5, o5, e6, o6, e7, and o7. In a manner similar to the above, similar calculations are executed for all of the 64 pixel data in the block. The resultant absolute values are added by the addition circuit 34.

Namely, in the DCT base weighting circuit 32, absolute value circuit 33, and addition circuit 34, the following calculations are executed for each (8×8) block.

$$|0.195 \times e0 - 0.556 \times o0 + 0.831 \times e1 - 0.981 \times o1 +$$
$$0.981 \times e2 - 0.831 \times o2 + 0.556 \times e3 - 0.195 \times o3| +$$
$$|0.195 \times e4 - 0.556 \times o4 + 0.831 \times e5 - 0.981 \times o5 +$$
$$0.981 \times e6 - 0.831 \times o6 + 0.556 \times e7 - 0.195 \times o7| +$$
$$\cdots + |0.195 \times e28 - 0.556 \times o28 + 0.831 \times e29 - 0.981 \times o29 +$$
$$0.981 \times e30 - 0.831 \times o30 + 0.556 \times e31 - 0.195 \times o32|.$$

Figure 9:
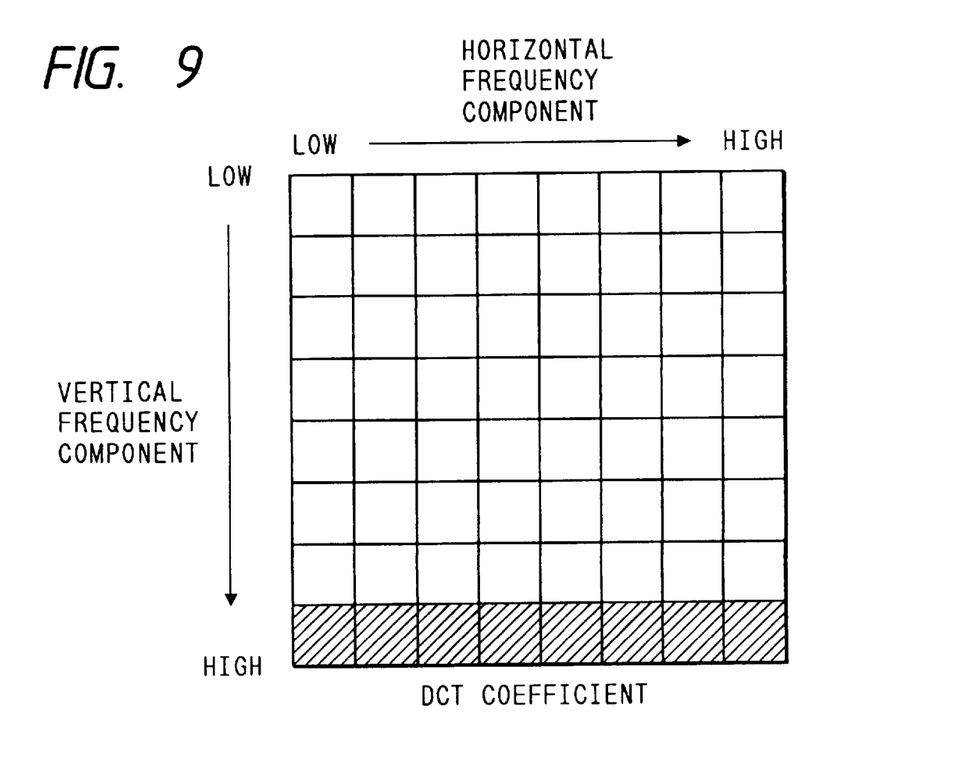
FIG. 9 is a diagram showing DCT coefficients which are used in the judgment of a field correlation in the third embodiment.

By executing the above calculations, the total of the absolute values of the coefficients in the high frequency component in the vertical direction of the DCT coefficients of the (8×8)-block is calculated (hatched portions in FIG. 9).

Characteristics of the DCT coefficients will now be described.

Generally, an image has a high correlation between adjacent pixels. When the DCT process is executed on the image, only the DC coefficients (DC component) and the AC component (alternating current component) of the low frequency component have values. The AC coefficients of the high frequency component has values near 0. That is, when the correlation in the image is high, large values are concentrated in a partial small number of coefficients due to the DCT process.

Therefore, by executing the quantization, the coefficient values of the high frequency component becomes almost 0. It is sufficient to encode only the coefficients of a remaining partial low frequency component, so that the data can be efficiently compressed.

That is, when the correlation among the pixels is strong, the coefficients of the high frequency component have small values. When the correlation among the pixels is small, large values are generated as coefficients of the high frequency component.

By using the above DCT characteristics, when the DCT coefficient (value which is output from the addition circuit 34) of the high frequency component in the vertical direction has a value larger than a predetermined threshold value, the decision circuit 35 judges that the inter-field correlation is small, so that the change-over switch 38 is connected to the (b) side so as to execute the field transformation. When the DCT coefficient has a value smaller than the threshold value, it is judged that the inter-field correlation is small, so that the switch 38 is connected to the (a) side so as to execute the frame transformation.

When it is judged by the above decision method that the inter-field correlation is small, the switch 38 is connected to the (a) side by the decision circuit 35, so that the block image data stored in the buffer memory 36 is input to the (8×8) DCT circuit 39 for performing the frame transformation.

On the other hand, when it is judged that the inter-field correlation is large, the switch 38 is connected to the (b) side by the decision circuit 35. Thus, the block image data is sent to the (4×8×2) DCT circuit 40 to perform the field transformation.

A selection signal S20 indicating which one of the frame transformation and the field transformation was selected is supplied from the decision circuit 35 to the recording circuit 45.

The transformed block data is input to the quantization circuit 42 through the change-over switch 41 (R side) and is quantized. The quantized image data is encoded by the variable length encoding circuit 43 and is transformed into the data of a predetermined rate by the buffer memory 44 and is sent to the recording circuit 45.

The recording circuit 45 adds an error correction code, selection signal S20, and the like to the encoded data and executes a predetermined modulating process for recording.

The information data processed by the recording circuit 45 is recorded onto the magnetic tape 47 by the recording head 46.

The data which is output from the (8×8) DCT circuit 39 is the data which was read out in accordance with the order of the numbers shown in FIG. 10A. The data which is output from the (4×8×2) DCT circuit 40 is the data which was read out in accordance with the order of numbers shown in FIG. 10B.

The processing operation upon reproduction will now be described hereinbelow.

First, when the reproducing operation is instructed by the operation unit 37, the change-over switch 41 is connected to the P side. The switching operation of the switch 38 is controlled by the selection signal S20 from the reproduction circuit 49. Further, the (8×8) (inverse) DCT circuit 39 and the (4×8×2) (inverse) DCT circuit 40 are switched to the inverse DCT transforming (frequency data→sampling data) process.

The information data recorded on the magnetic tape 47 is read out by the reproducing head 48 and is subjected to the demodulating process and error correcting process by the reproduction circuit 49, thereby reproducing the recorded selection signal S20 together with the image data.

The decoding circuit 50 decodes the variable length encoding data.

The decoding data which was output from the decoding circuit 50 is inversely quantized by the inverse quantization circuit 51.

The inversely quantized data is input to the (8×8) (inverse) DCT circuit 39 or (4×8×2) (inverse) DCT circuit 40 through the change-over switch 38 and is subjected to a process which is different from the DCT transformation which was executed in the recording mode. The inversely DCT transformed image data is subjected to a concealment process or the like of the error uncorrectable data by the output circuit 22, so that the reconstructed digital image signal is output from the output section 27.

The switching operation of the switch 38 is controlled on the basis of the selection signal S20 which was output from the reproduction circuit 49.

A digital VTR of the fourth embodiment according to the invention will now be described hereinbelow with reference to the drawings.

Figure 11:
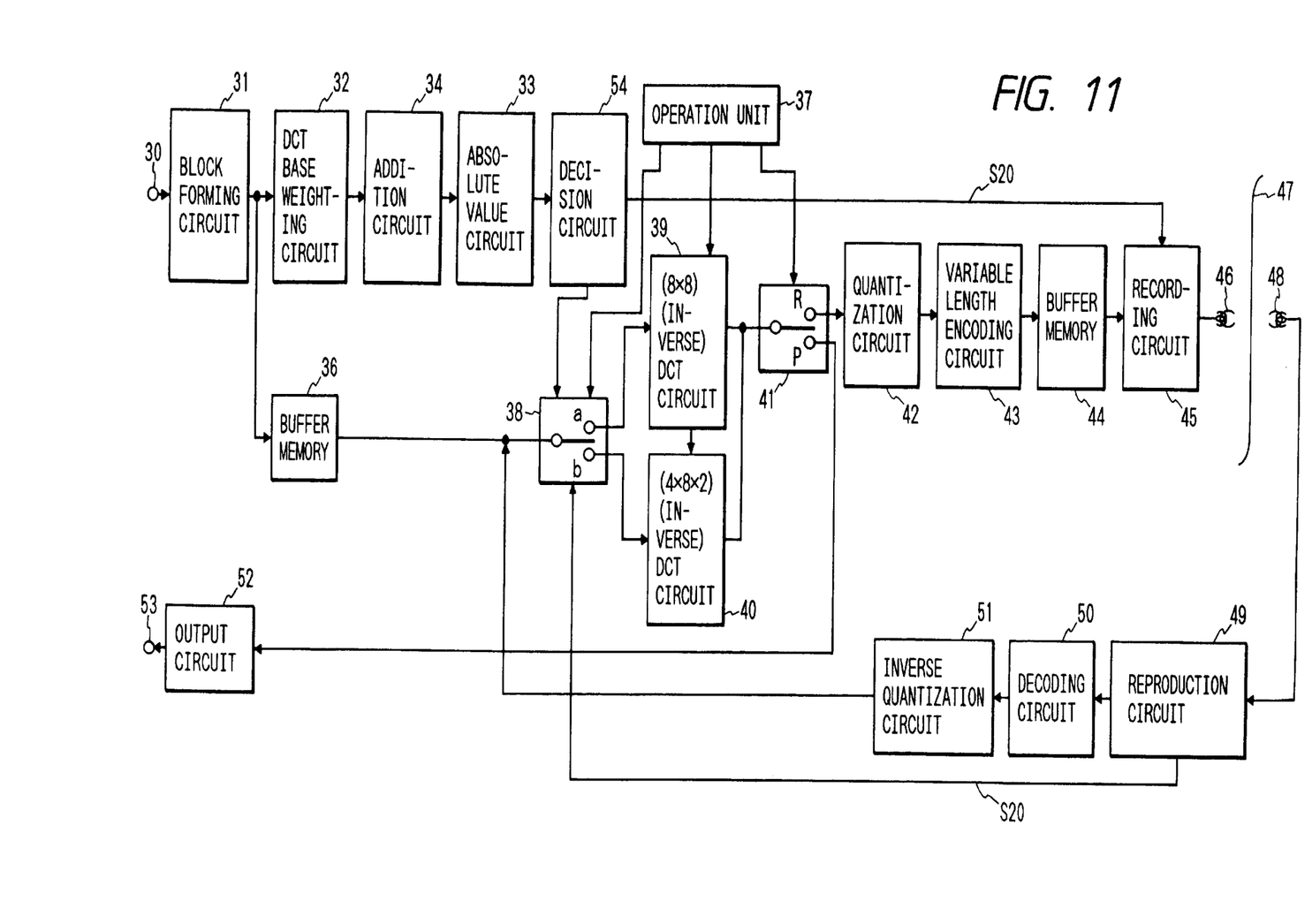
FIG. 11 is a block diagram of a digital VTR of the fourth embodiment according to the invention.

FIG. 11 is a block diagram of the digital VTR of the fourth embodiment according to the invention. In FIG. 11, the same or corresponding portions as those shown in FIG. 7 are designated by the same reference numerals and their descriptions are omitted here.

In FIG. 11, reference numeral 54 denotes a decision circuit to decide a size of the field correlation.

The decision circuit 54 differs from the decision circuit 35 with respect to a point that the preset threshold value differs.

In the fourth embodiment, the connecting order of the absolute value circuit 33 and addition circuit 34 differs from that in the apparatus of the third embodiment.

Figure 12:
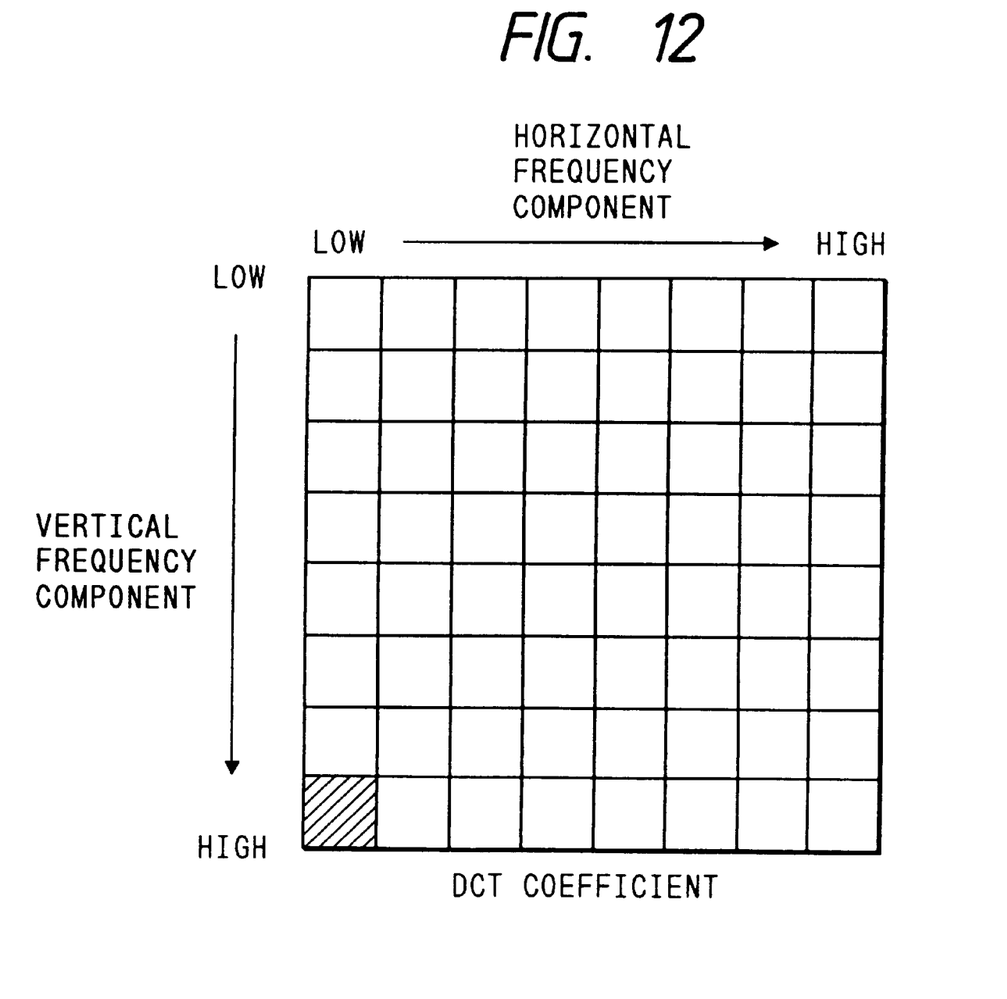
FIG. 12 is a diagram showing DCT coefficients which are used in the judgment of a field correlation in the fourth embodiment.

Namely, the data which is input to the decision circuit 54 has the values of the DCT coefficients (hatched portions in FIG. 12) in the horizontal direction of the high frequency component in the vertical direction. By comparing those values with a preset threshold value, the size of inter-field correlation is judged.

The descriptions of the portions other than the above points are omitted here because they are substantially the same as those in the third embodiment.

The present invention can be embodies in other various forms without departing from the spirit and main feature of the invention.

For instance, in the description of each of the above embodiments, the block forming circuit has divided the input signal into blocks each comprising (6×8) pixels. However, the invention is not limited to such an example. The orthogonal transform circuit described in each of the above embodiments has switched the DCT process and the inverse DCT process by the control signal. However, it is also possible to use an orthogonal transform circuit which execute an inverse DCT process when the signal is input from the direction that is quite opposite to that upon encoding.

In other words, the foregoing description of the embodiments has been given for illustrative purposes only and is not to be construed as imposing any limitation in any respect.

The scope of the invention is, therefore, to be determined solely by the following claims and not limited by the text of the specification and alterations made within a scope equivalent to the scope of the claims fall within the true spirit and scope of the invention.

What is claimed is:

1. An encoding and decoding apparatus comprising:
   input means for inputting information data;
   orthogonal transforming means for performing an orthogonal transform on the input information data;
   encoding means for encoding transformation data transformed by said orthogonal transforming means;
   decoding means for decoding the encoded data encoded by said encoding means; and
   selecting means for selecting, as data to be input to said orthogonal transforming means, one of the input information data and the decoded data, said orthogonal transforming means performing the orthogonal transformation on the input information data when said selecting means selects the input information data and performing an inverse orthogonal transformation on the decoded data when said selecting means selects the decoded data.

2. An apparatus according to claim 1, wherein said information data is a digital image signal.

3. An apparatus according to claim 1, wherein said orthogonal transforming means executes a DCT transformation.

4. An apparatus according to claim 1, further having recording means for recording the data encoded by said encoding means onto a recording medium.

5. An apparatus according to claim 4, wherein said recording means records the encoded data onto a tape-shaped recording medium by using a magnetic head.

6. An apparatus according to claim 1, further having block forming means for forming blocks from the information data which was input by said input means.

7. An apparatus according to claim 6, wherein said orthogonal transforming means has a plurality of kinds of transforming modes, and said encoding and decoding apparatus further has selecting means for adaptively switching said plurality of kinds of transforming modes.

8. An apparatus according to claim 7, further having recording means for recording the data encoded by said encoding means and mode information indicative of the transforming mode selected by said selecting means onto a recording medium.

9. An apparatus according to claim 8, further comprising:
   reproducing means for reproducing the data recorded on said recording medium and
   separating the encoded data and the mode information from the reproduced data,
   and wherein said decoding means decodes the encoded data and selects the transforming mode of said inverse orthogonal transformation according to the mode information.

10. An encoding apparatus comprising:
    input means for inputting image data;
    transforming means for orthogonally transforming the input image data into orthogonal transform coefficients using at least two transforming modes of orthogonal transformation including a field transformation mode to obtain first orthogonal transform coefficients and a frame transformation mode to obtain second orthogonal transform coefficients;
    decision means for deciding a magnitude of a field correlation of the image data based on third orthogonal transform coefficients of the image data, the third orthogonal transform coefficients being different from each of the first and second orthogonal transform coefficients;
    selecting means for selecting one of the first and second orthogonal transform coefficients in accordance with the magnitude of field correlation decided by said decision means; and
    encoding means for encoding the orthogonal transform coefficients selected by said selecting means.

11. An apparatus according to claim 10, further having recording means for recording the data encoded by said encoding means onto a recording medium.

12. An apparatus according to claim 11, wherein said recording means records said encoding data onto a tape-shaped recording medium by using a magnetic head.

13. An apparatus according to claim 11, wherein said recording means also records mode information indicative of the transforming mode selected by said selecting means.

14. An encoding apparatus comprising:
    input means for inputting image data;
    calculating means for calculating a sum of orthogonal transform coefficients of a high frequency region on the basis of the image data;
    decision means for deciding a field correlation of the image data on the basis of the sum calculated by said calculating means;
    transforming means for performing an orthogonal transforation on the image data, said transforming means having at least two transforming modes including a field transforming mode and a frame transforming mode, and for selecting one of the field and frame transforming modes according to the field correlation decided by said decision means; and
    encoding means for encoding the image data transformed by said transforming means.

15. An apparatus according to claim 14, further having recording means for recording the image data encoded by said encoding means onto a recording medium.

16. An image encoding apparatus comprising:
    extracting means for extracting a high frequency component of orthogonal transform coefficients from input digitized interlaced image data;
    decision means for judging a field correlation of the image data on the basis of the high frequency component of orthogonal transform coefficients extracted by said extracting means; and
    encoding means for encoding the input digitized interlaced image data, said encoding means selecting one of a field encoding mode on a field basis and a frame encoding mode on a frame basis for use in encoding the input digitized interlaced image data in accordance with a result of said decision means.

17. An apparatus according to claim 16,
    wherein said encoding means includes transforming means for orthogonally transforming the input digitized interlaced image data, said transforming means operating either in a first mode in which field blocks of pixel data derived from the digitized interlaced image data are transformed, or in a second mode in which frame blocks of pixel data derived from the digitized interlaced image data are transformed.

18. An apparatus according to claim 17, further having recording means for recording the image data encoded by said encoding means onto a recording medium.

19. An apparatus according to claim 17, further having reconstructing means for reconstructing the encoded image data encoded by said encoding means.

20. An encoding and decoding method comprising the steps of:

inputting information data;

orthogonally transforming the input information data using an orthogonal transformation apparatus;

encoding transformation data transformed by said orthogonal transforming step;

decoding the encoded data encoded by said encoding step; and selecting, as data to be input to the orthogonal transformation apparatus, one of the input information data and the decoded data, the orthogonal transformation apparatus performing said orthogonal transforming step on the input information data when said selecting step selects the input information data and performing an inverse orthogonal transformation on the decoded data when said selecting step selects the decoded data.

21. An encoding method comprising:

an inputting step of inputting image data;

a first transforming step of orthogonally transforming the input image data into first orthogonal transform coefficients using a field orthogonal transformation;

a second transforming step of orthogonally transforming the input image data into second orthogonal transform coefficients using a frame orthogonal transformation;

a deciding step of deciding a magnitude of a field correlation of the image data based on third orthogonal transform coefficients of the image data, the third orthogonal transform coefficients being different from each of the first and second orthogonal transform coefficients;

a selecting step of selecting one of the first and second orthogonal transform coefficients in accordance with the magnitude of field correlation decided in said deciding step; and an encoding step of encoding the orthogonal transform coefficients selected in said selecting step.

22. An encoding method comprising the steps of:

inputting image data;

calculating a sum of orthogonal transform coefficients of a high frequency region on the basis of the image data;

deciding a field correlation of the image data on the basis of the sum calculated in said calculating step;

performing an orthogonal transformation on the image data, said performing step including the step of selecting between at least a field transforming mode and a frame transforming mode according to the field correlation decided in said deciding step; and encoding the image data transformed in said performing step.

23. An image encoding method comprising the steps of:

extracting a high frequency component of orthogonal transform coefficients of a high frequency region from input digitized interlaced image data;

judging a field correlation of the image data on the basis of the high frequency component of orthogonal transform coefficients extracted in said extracting step; and encoding the input digitized interlaced image data, said encoding step selecting one of a field encoding mode on a field basis and a frame encoding mode on a frame basis for use in encoding the input digitized interlaced image data in accordance with a result of said judging step.

* * * * *

UNITED STATES PATENT AND TRADEMARK OFFICE
CERTIFICATE OF CORRECTION

PATENT NO.    : 6,078,615
DATED         : June 20, 2000
INVENTOR(S)   : YUKINORI YAMAMOTO ET AL.        Page 1 of 3

It is certified that error appears in the above-identified patent and that said Letters Patent is hereby corrected as shown below:

ON THE TITLE PAGE:

[56] References Cited, under Attorney, Agent, or Firm- "Fitzpatrick Cella Harper & Scinto" should read --Fitzpatrick, Cella, Harper & Scinto--; and

[57] ABSTRACT

Line 3, "lated" should read --lates--; and
Line 13, "transforation" should read --transformation--.

COLUMN 2:

Line 5, "process" should read --process in--;
Line 6, "namely," should be deleted;
Line 26, "FIG. 4A," should read --FIG.4A,--; and
Line 35, "SUMMARY" should read --SUMMARY--.

COLUMN 4:

Line 38, "the," should read --the--.

COLUMN 6:

Line 30, "/16]k=0 to 7" should read --/16]  k=0 to 7--; and
Line 67, "AC" should read --AC--.

UNITED STATES PATENT AND TRADEMARK OFFICE
CERTIFICATE OF CORRECTION

PATENT NO.    : 6,078,615

DATED         : June 20, 2000

INVENTOR(S)   : YUKINORI YAMAMOTO ET AL.

It is certified that error appears in the above-identified patent and that said Letters Patent is hereby corrected as shown below:

COLUMN 8:

Line 46, "embodies" should read --embodied--;
    Line 47, "feature" should read --features--;
    Line 57, "execute" should read --executes--; and
    Line 66, "fall" should read --that fall--.

COLUMN 9:

Line 45, close up right margin;
    Line 46, close up left margin; and
    Line 48, "and wherein" should read --wherein--.

UNITED STATES PATENT AND TRADEMARK OFFICE
CERTIFICATE OF CORRECTION

PATENT NO.    : 6,078,615
DATED         : June 20, 2000
INVENTOR(S)   : YUKINORI YAMAMOTO ET AL.

It is certified that error appears in the above-identified patent and that said Letters Patent is hereby corrected as shown below:

COLUMN 10:

Line 51, close up right margin; and
    Line 52, close up left margin.

Signed and Sealed this

Twenty-second Day of May, 2001

*Attest:*

NICHOLAS P. GODICI

*Attesting Officer*    *Acting Director of the United States Patent and Trademark Office*